United States Patent
Shiota et al.

(10) Patent No.: US 9,357,407 B2
(45) Date of Patent: May 31, 2016

(54) SWITCHING DEVICE AND METHOD FOR CONTROLLING FRAME TRANSMISSION AND RECEPTION

(75) Inventors: Yoshiaki Shiota, Tokyo (JP); Hideki Tanaka, Tokyo (JP); Shinya Kurosaki, Tokyo (JP)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 160 days.

(21) Appl. No.: 14/124,980

(22) PCT Filed: May 29, 2012

(86) PCT No.: PCT/JP2012/003495
§ 371 (c)(1),
(2), (4) Date: Jan. 28, 2014

(87) PCT Pub. No.: WO2012/169145
PCT Pub. Date: Dec. 13, 2012

(65) Prior Publication Data
US 2014/0160922 A1 Jun. 12, 2014

(30) Foreign Application Priority Data
Jun. 10, 2011 (JP) .................. 2011-129789

(51) Int. Cl.
*H04W 24/04* (2009.01)
*H04L 29/14* (2006.01)
*H04L 29/06* (2006.01)

(52) U.S. Cl.
CPC ............... *H04W 24/04* (2013.01); *H04L 69/14* (2013.01); *H04L 69/18* (2013.01); *H04L 69/40* (2013.01)

(58) Field of Classification Search
CPC ......... H04L 45/22; H04L 45/28; H04L 47/10; H04L 47/11; H04L 47/125; H04L 69/14; H04L 69/18; H04L 69/40; H04W 24/04
USPC ....................................................... 370/228
See application file for complete search history.

(56) References Cited

U.S. PATENT DOCUMENTS 5,586,112 A * 12/1996 Tabata ................... 370/225
7,002,908 B1   2/2006 Lund et al.
(Continued)

FOREIGN PATENT DOCUMENTS

| JP | 2002-261854 | 9/2002 |
| JP | 2008-054058 | 3/2008 |

(Continued)

OTHER PUBLICATIONS

Extended European Search Report corresponding to European Application No. 12796098.7, dated Apr. 8, 2015, 7 pages.
(Continued)

*Primary Examiner* — Huy D Vu
*Assistant Examiner* — Stephen K Clawson
(74) *Attorney, Agent, or Firm* — Wilmer Cutler Pickering Hale and Dorr LLP

(57) ABSTRACT

Wireless line termination units 21 and 22 respectively transmit and receive frames via wireless lines 51 and 52. Line termination units 25 and 26 respectively exchange frames with the wireless line termination units 21 and 22. The wireless lines 51 and 52 are treated as one virtual line. A radio monitoring unit 272 monitors the state of the wireless lines 51 and 52, and in accordance with the redundancy mode, instructs the wireless line termination units 21 and 22 to exchange copy frames with other wireless line termination unit and to abandon received frames. A communication path control unit 273 sets, in accordance with the monitoring result as to the state of the wireless lines by the radio monitoring unit 272, the line termination units 25 and 26 to each be an active system or a standby system. A switch core 271 passes frames to be transmitted to the line termination unit that operates as the active system.

10 Claims, 11 Drawing Sheets

(56) References Cited

U.S. PATENT DOCUMENTS

| | | | |
|---|---|---|---|
| 2001/0046207 A1* | 11/2001 | Isonuma et al. | 370/223 |
| 2003/0043736 A1* | 3/2003 | Gonda | 370/218 |
| 2004/0252645 A1* | 12/2004 | Gross et al. | 370/242 |
| 2005/0135235 A1 | 6/2005 | Maruyama et al. | |
| 2005/0243497 A1* | 11/2005 | Cameron et al. | 361/119 |
| 2006/0291378 A1 | 12/2006 | Brotherston et al. | |
| 2008/0049611 A1* | 2/2008 | Higashitaniguchi et al. | 370/228 |
| 2008/0049661 A1 | 2/2008 | Komaili et al. | |
| 2008/0291826 A1* | 11/2008 | Licardie et al. | 370/230 |
| 2010/0246396 A1 | 9/2010 | Licardie et al. | |
| 2013/0064094 A1* | 3/2013 | Nakao et al. | 370/238 |

FOREIGN PATENT DOCUMENTS

| | | |
|---|---|---|
| JP | 2008-160227 | 7/2008 |
| JP | 2009-232000 | 10/2009 |
| JP | 2010-134515 | 6/2010 |
| JP | 2010-258606 | 11/2010 |
| JP | 2010-288067 | 12/2010 |
| JP | 2011-004124 | 1/2011 |
| RU | 2198473 C2 | 2/2003 |
| WO | WO-0165783 A1 | 9/2001 |
| WO | WO-2004/051955 A1 | 6/2004 |

OTHER PUBLICATIONS

Japanese Office Action issued by the Japanese Patent Office for Japanese Application No. 2011-129789 mailed on Nov. 11, 2014 (6 pages includes translation).

International Search Report corresponding to PCT/JP2012/003495, dated Jul. 6, 2012, 5 pages.

Russian Decision on Grant issued in corresponding Russian Application No. 2014100084/08(000185), dated Mar. 3, 2016, 17 pages.

* cited by examiner

SWITCHING DEVICE AND METHOD FOR CONTROLLING FRAME TRANSMISSION AND RECEPTION

CROSS-REFERENCE TO RELATED APPLICATIONS

This application is a national stage application of International Application No. PCT/JP2012/003495, entitled "Switching Device and Method for Controlling Frame Transmission and Reception," filed on May 29, 2012, which claims the benefit of the priority of Japanese patent application No. 2011-129789, filed on Jun. 10, 2011, the disclosures of each of which are hereby incorporated by reference in their entirety.

TECHNICAL FIELD

The present invention relates to a switching device and a method for controlling frame transmission and reception.

BACKGROUND ART

With a wireless device including a layer 2 switch, the wireless section may be configured to be redundant. Redundancy with the wireless device including the layer 2 switch is generally made by IEEE 802.3 ad (a link aggregation). Such a redundant configuration is made in order to achieve load distribution (load balancing) or to improve fault tolerance.

With such a wireless device, switchover of a wireless port (a card-shaped device that carries out wireless communication) may take place in order to address an occurrence of a fault in the wireless port, replacement of the wireless port, a change in the wireless environment and the like. With the wireless device, when switchover of the wireless port takes place with the wireless section being configured to be redundant, a flush process (a clear process) of an FDB (Forward DataBase) learned by the layer 2 switch occurs. This flush process of the FDB causes flooding of frames. That is, unnecessary frame transfer is performed to disadvantageously increase the traffic. Further, missing (losses) of frames will be invited until communication is started with the wireless port newly switched to.

When the link aggregation is realized with the wireless device including the layer 2 switch, a wireless line termination unit (a card-shaped device that carries out wireless communication) that communicates via a wireless line exerts buffer control such as a transmission allocation and a transmission duplexing process. Further, the wireless line termination unit performs the ACT (active system)/SBY (standby system) management by software. For realizing these functions, it takes time for the wireless line termination unit to carry out the switchover process of the wireless port.

In the following, a description will be given of the technique relating to the aforementioned problem.

Patent Literature 1 discloses a data transfer method according to which all the main lines in a redundancy configuration can be switched. Patent Literature 1 discloses a redundant configuration in which a virtual path is generated by a plurality of main lines and one or more protection lines. Using the virtual path, transmission and reception of frames are performed.

Patent Literature 2 discloses a transfer system in which a link aggregation scheme is applied to a plurality of lines. With this system, a special frame referred to as the MRL (Multi-Radio-Line) frame is used for realizing the link aggregation.

Patent Literature 3 discloses a technique for performing the line switching between two lines while maintaining the traffic using layer 2 switches. Note that Patent Literature 3 is silent about the configuration in which redundancy is made in order to achieve the load distribution in the wireless section (an N+0 configuration).

CITATION LIST

Patent Literatures

Patent Literature 1: Japanese Unexamined Patent Application Publication No. 2008-54058
Patent Literature 2: Japanese Unexamined Patent Application Publication No. 2010-258606
Patent Literature 3: Japanese Unexamined Patent Application Publication No. 2011-4124

SUMMARY OF INVENTION

Technical Problem

With the techniques disclosed in Patent Literatures 1 and 2, since special frames are used for realizing the link aggregation, an increase in frames being transmitted and received on the network is invited, whereby the band in use increases. Further, Patent Literature 3 does not suggest or teach the case where switchover of the wireless port or a failure of the wireless port takes place in a so-called N+0 configuration.

As described above, switchover of the wireless port takes place in order to address a failure of the wireless port, replacement of the wireless port, a change in the wireless environment and the like. As described above, switchover of the wireless port puts a great load on the wireless line termination unit, and requires time for processing. Further, the techniques of Patent Literatures 1 to 3 still do not fully cope with an increase in the band in use nor do they fully achieve the load distribution. That is, there exists a problem that efficient and full port switchover cannot be realized.

The present invention has been made in consideration of the problem noted above, and the main object thereof is to provide a switching device and a method for controlling frame transmission and reception with which efficient and full port switchover can be realized.

Solution to Problem

An aspect of a switching device according to the present invention is a switching device comprising: first wireless line terminating means for transmitting and receiving frames via a first wireless line; second wireless line terminating means for transmitting and receiving frames via a second wireless line; first line terminating means for exchanging frames with the first wireless line terminating means; second line terminating means for exchanging frames with the second wireless line terminating means; radio monitoring means for monitoring a state of the first and second wireless lines, the radio monitoring means instructing the first and second wireless line terminating means to exchange copy frames with other wireless line terminating means and to abandon the received frames, in accordance with a redundancy mode of the first and second wireless lines; communication path control means for setting the first and second line terminating means to each be an active system or a standby system in accordance with a monitoring result obtained by the radio monitoring means as to the state of the wireless lines; and a switch core that passes frames to be transmitted to the line terminating means operating as the active system, wherein the first and second wireless lines are subjected to a link aggregation so as to be treated as one virtual line.

An aspect of a method for controlling frame transmission and reception according to the present invention is wherein a switching device includes first wireless line terminating means for transmitting and receiving frames via a first wireless line, second wireless line terminating means for transmitting and receiving frames via a second wireless line, first line terminating means for exchanging frames with the first wireless line terminating means, and second line terminating means exchanging frames with the second wireless line terminating means, the switching device performs a link aggregation with which the first and second wireless lines are treated as one virtual line, the switching device monitoring a state of the first and second wireless lines and instructing the first and second wireless line terminating means, in accordance with a redundancy mode of the first and second wireless lines, to exchange copy frames with other wireless line terminating means and to abandon received frames, the switching device sets, in accordance with a monitoring result of the wireless lines, the first and second line terminating means to each be an active system or a standby system, and the switching device passes frames to be transmitted to the line terminating means operating as the active system.

Advantageous Effects of Invention

The present invention can provide a switching device and a method for controlling frame transmission and reception with which efficient and full port switchover can be realized.

DESCRIPTION OF EMBODIMENTS

First Embodiment

In the following, with reference to the drawings, a description will be given of an embodiment of the present invention.

Figure 1:
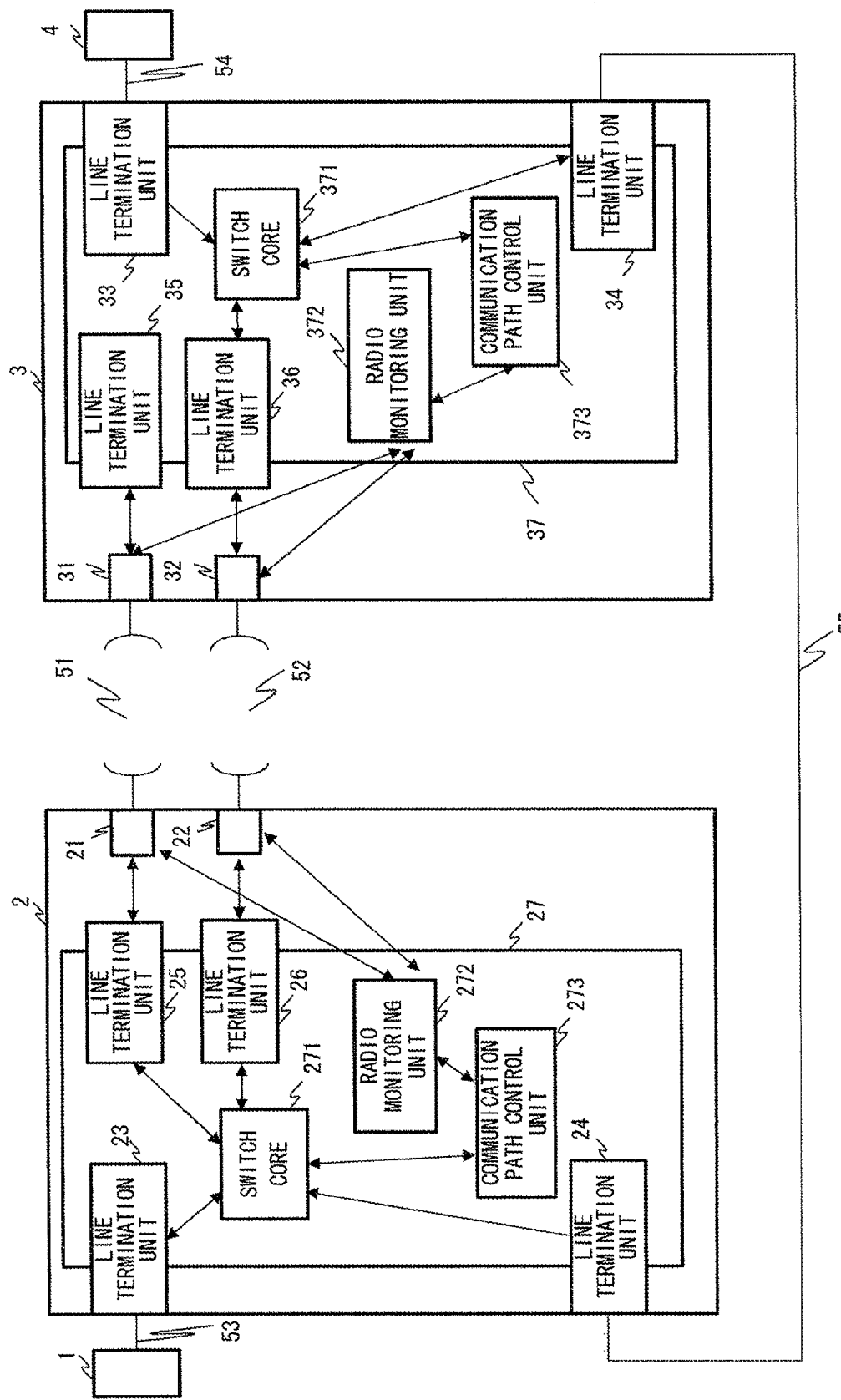
FIG. 1 is a block diagram showing the configuration of a system including a switching device according to a first embodiment.

FIG. 1 is a block diagram showing the configuration of a communication system according to the present embodiment. The system includes a device 1, a layer 2 switch 2, a layer 2 switch 3, and a device 4. The layer 2 switch 2 and the layer 2 switch 3 are connected to each other via a line 51 and a line 52. The line 51 and the line 52 are wireless lines. The device 1 and the layer 2 switch 2 are connected to each other via a line 53. The device 4 and the layer 2 switch 3 are connected to each other via a line 54. Note that, as shown in the drawing, the layer 2 switch 2 and the layer 2 switch 3 may be connected to each other via a line 55 being a wired line. The device 1 and the device 4 are each a device that transmits and receives frames.

The layer 2 switch 2 includes a wireless line termination unit 21, a wireless line termination unit 22, a line termination unit 23, a line termination unit 24, a line termination unit 25, a line termination unit 26, and a switch unit 27. The switch unit 27 includes a switch core 271, a radio monitoring unit 272, and a communication path control unit 273.

The wireless line termination unit 21 and the wireless line termination unit 22 are each a processing unit that transmits and receives frames via the wireless line. The line termination unit 23 and the line termination unit 24 are each a processing unit that transmits and receives frames to and from any element connected via the wire. The wireless line termination unit 21 and the wireless line termination unit 22 are each a card-shaped device in general. The line termination unit 25 and the line termination unit 26 are each a processing unit that exchange frames with the wireless line termination unit 21 and the wireless line termination unit 22, respectively.

In the following, a description will be given of the switch unit 27. The switch core 271 is a processing unit that includes therein an FDB (Forward DataBase, not shown) and that controls frame transmission. The switch core 271 passes transmission frames to a line termination unit set to be an active system.

The radio monitoring unit 272 has the following functions. Note that, each of the functions will be described in detail later with reference to FIGS. 2 to 12.

(1) To determine whether or not a wireless line is made redundant; when it is, detect the mode thereof.

(2) To monitor the state of a wireless line section.

(3) To instruct the wireless line termination unit 21 or 22 to copy transmission frames.

(4) To instruct the wireless line termination unit 21 or 22 to select the received frames.

(5) To detect that the received frames are abandoned.

(6) To calculate the wireless line section band.

(7) To provide a variety of notification to the communication path control unit 273.

Note that, (6) Calculation of the wireless line section band by the radio monitoring unit 272 is performed by subtracting the band used by the STM (Synchronous Transfer Mode) and the like from the total radio band. (6) Calculation of the wireless line section band is performed upon a change in the radio band caused by the AMR (Adaptive Modulation Radio), for example.

The communication path control unit 273 has the following functions. Note that, each of the functions will be described in detail later with reference to FIGS. 2 to 12.

(1) To receive notification from the radio monitoring unit 272.

(2) To control the operation of the active system (ACT) and the standby system (SBY) for the line termination units and the wireless line termination units for each redundant configuration mode (a control link aggregation).

Note that, since the layer 2 switch 3 is structured substantially identically to the layer 2 switch 2 and its constituents perform similar operations, the detailed description is not repeated.

Subsequently, with reference to FIG. 2, a description will be given of the operation of the system in an N+1 mode (N being a natural number of 1 or more) as a redundant configuration mode. In the following description, the N+1 mode is the mode in which at least one communication path (one of the line 51 and the line 52 in FIG. 1) operates as the standby system. The description will be given based on the assumption that N=1.

Figure 2:
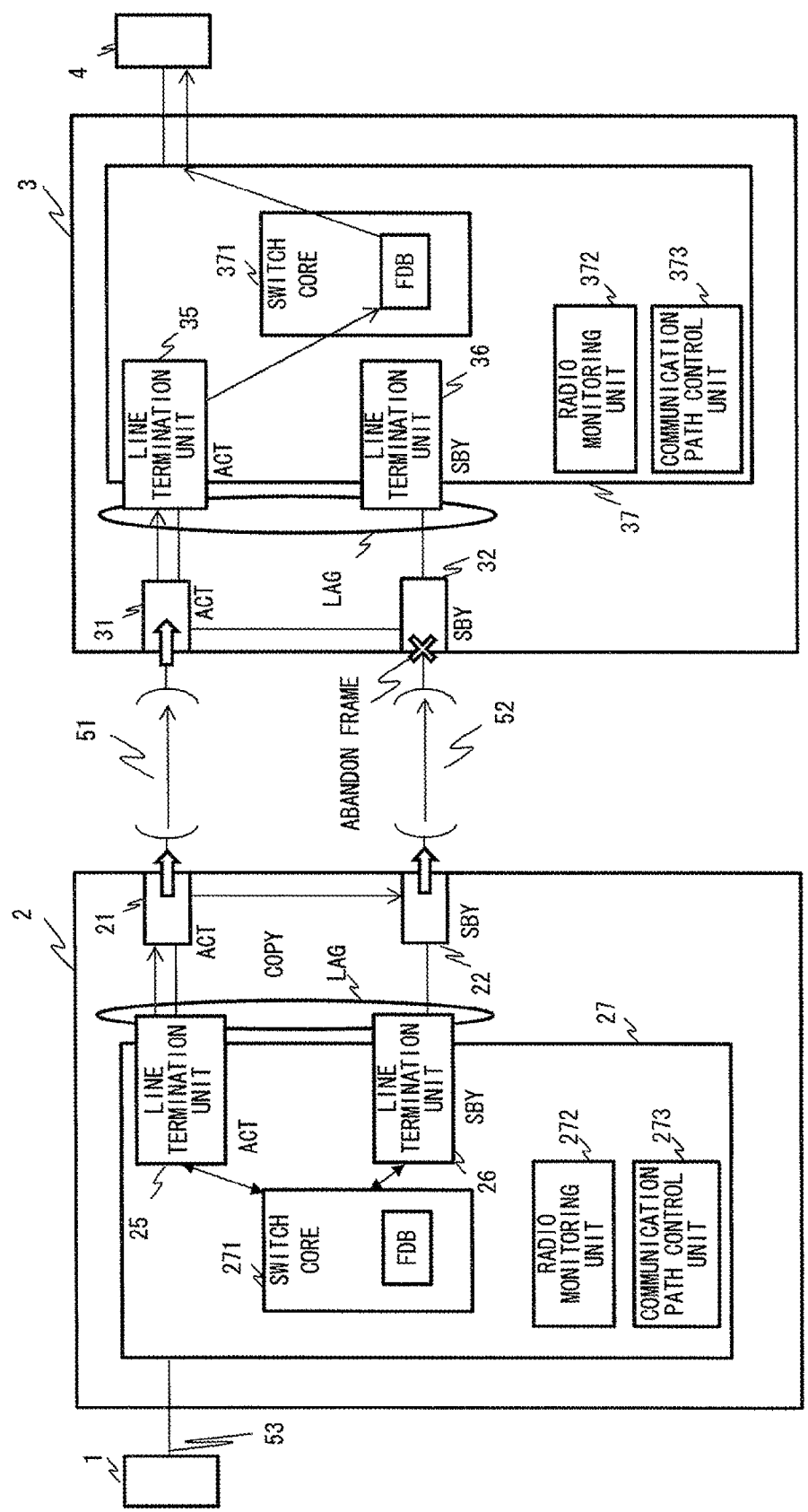
FIG. 2 shows the operations of the system according to the first embodiment (when a 1+1 mode is set)

FIG. 2 shows the operation of the system operating in the 1+1 mode (in which the line 51 is the main line and the line 52 is the protection line). The wireless line termination unit 21, the line termination unit 25, the wireless line termination unit 31, and the line termination unit 35 perform operations that are suitable for the active system (ACT). The wireless line termination unit 22, the line termination unit 26, the wireless line termination unit 32, and the line termination unit 36 perform operations that are suitable for the standby system (SBY). The line 51 and the line 52 are subjected to the link aggregation (i.e., treated as one virtual line). Note that, any known scheme should be employed to achieve a variety of setting for the link aggregation.

Here, the 1+1 mode is the mode in which identical frames are exchanged via the line 51 and the line 52, and when normally performed, the frames exchanged via the line 52 are abandoned.

When it is determined to operate in the operation in the 1+1 mode (when the mode is set), the line termination units and the wireless line termination units start performing operations corresponding to the 1+1 mode. The radio monitoring unit 272 detects that the wireless lines are made redundant, and that the redundancy is made in the 1+1 mode. Then, the radio monitoring unit 272 notifies the detection result to the communication path control unit 273.

The radio monitoring unit 272 calculates the wireless section band, and notifies the calculation result to the communication path control unit 273. The radio monitoring unit 272 instructs the wireless line termination unit 21 operating as the active system (ACT) to copy the frames to be transmitted. Further, the radio monitoring unit 272 instructs the wireless line termination unit 22 operating as the standby system (SBY) to abandon the received frames.

The communication path control unit 273 sets an LAG (link aggregation) to the line termination units 25 and 26 in response to the setting of redundancy in the 1+1 mode. Specifically, the communication path control unit 273 sets the line termination unit 25 to be the active system (ACT), and sets the line termination unit 26 to be the standby system (SBY).

Note that the operations described above are performed also as to the layer 2 switch 3.

Next, a description will be given of the operations when frames are transmitted from the device 1 to the device 4. Note that, in the following description, it is understood that an appropriate value is previously set in the FDB in the switch core 271. Since the destination of frames output from the device 1 is the device 4, the switch core 271 refers to the FDB and transmits the frames in the direction of the line 51 (that is, to the line termination unit 25 operating as the active system). Since the line termination unit 25 operates as the active system (ACT), the line termination unit 25 transmits the received frames to the wireless line termination unit 21.

The wireless line termination unit 21 operates as the active system (ACT). The wireless line termination unit 21 copies the received frames, and transmits the copied frames to the wireless line termination unit 22. Further, the wireless line termination unit 21 transmits transmission frames to the wireless line termination unit 31 via the line 51. The wireless line termination unit 22 transmits the frames received from the wireless line termination unit 21 to the wireless line termination unit 32 via the line 52. Thus, the identical frames are transmitted to the line 51 and the line 52.

The wireless line termination units 31 and 32 receive the frames. Here, the radio monitoring unit 372 instructs the wireless line termination unit 32 operating as the standby system (SBY) to abandon the frames. In response thereto, the wireless line termination unit 32 abandons the received frames. The wireless line termination unit 31 transmits the received frames to the line termination unit 35. The frames arrive at the device 4 via the switch core 371.

Note that, in the foregoing, the description has been given of the case where the device 1 transmits frames to the device 4. However, substantially identical operations are performed also in the case where the device 4 transmits frames to the device 1.

Figure 3:
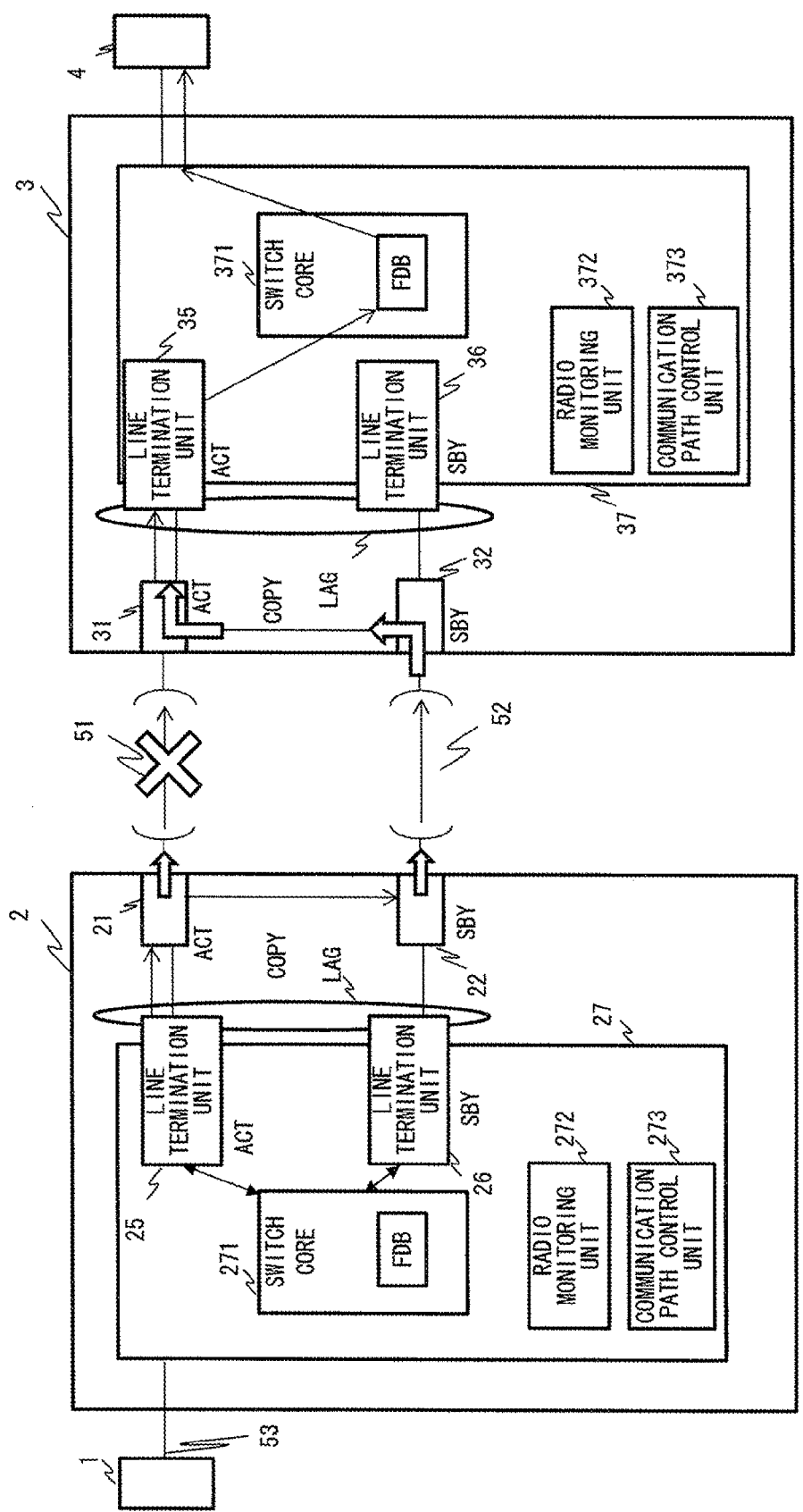
FIG. 3 shows the operations of the system according to the first embodiment (when the 1+1 mode is set)

Next, with reference to FIG. 3, a description will be given of the operations of the system in the case where the line 51 encounters any defective conditions in the configuration shown in FIG. 2 (the 1 (N)+1 mode). As described above, the radio monitoring unit 272 monitors the status of the line 51 and the line 52. The radio monitoring unit 272 notifies the communication path control unit 273 about an occurrence of an abnormality in the line 51. Since the system is operating in the 1+1 mode, the communication path control unit 273 allows the operations to continue with the line termination unit 25 being kept operating as the active system (ACT) and the line termination unit 26 being kept operating as the standby system (SBY) (i.e., no setting change is performed).

Thus, the wireless line termination unit 21 copies the frames and transmits the copy to the wireless line termination unit 22. The wireless line termination unit 22 transmits the frames received from the wireless line termination unit 21 to the wireless line termination unit 32 via the line 52.

Here, the link aggregation (i.e., the line 51 and the line 52 being treated as one virtual line) is set to the line termination units 25 and 26. Further, the frames output from the line termination unit 25 are copied and transmitted from the wireless line termination unit 22. Accordingly, even when a failure occurs in the line 51, the frames are treated as being normally transmitted. Therefore, no necessity of changing the setting of the FDB in the switch core 271 arises, and the FDB flush (clearing the FDB) is not executed.

Subsequently, a description will be given of frame transmission from the device 1 to the device 4 upon an abnormality in the line 51. As has been described with reference to FIG. 2, the wireless line termination units 21 and 22 transmit frames via the lines 51 and 52. However, since the line 51 is suffering from an abnormality, only the frames via the line 52 are normally transmitted. Here, since no failure is occurring in the line 52 and the link aggregation has been performed, there is no abnormality in the frame transmission from the layer 2 switch 2 to the layer 2 switch 3. Since there is no abnormality, the setting of the FDB in the switch core 271 is not changed (i.e., no FDB flush occurs).

Next, a description will be given of the operations of the layer 2 switch 3 on the reception side. The radio monitoring unit 372 senses that an abnormality is occurring in the line 51. The radio monitoring unit 372 instructs the wireless line termination unit 32 to transmit the received frames to the wireless line termination unit 31. The wireless line termination unit 32 transmits frames being the copy of the received frames to the wireless line termination unit 31. The wireless line termination unit 31 transmits the frames received from the wireless line termination unit 32 to the line termination unit 35. The frames arrive at the device 4 via the switch core 371. Here, since no failure is occurring in the line 52 and the link aggregation has been performed, the radio monitoring unit 372 determines that there is no abnormality in frame transmission from the layer 2 switch 2 to the layer 2 switch 3. Since there is no abnormality, the setting of the FDB in the switch core 371 is not changed (i.e., no FDB flush occurs).

Note that, though the description above has been given of the case where the device 1 transmits frames to the device 4, substantially identical operations are performed also in the case where the device 4 transmits frames to the device 1.

Subsequently, with reference to FIG. 4, a description will be given of the operations of the system in the N+0 mode (N being a natural number of 2 or more) as the redundant configuration mode. In the following description, the N+0 mode is the mode in which two (or more) communication paths (the line 51 and the line 52 in FIG. 4) both operate as the main lines. In the following, the description will be given based on the assumption that N=2.

In the 2+0 mode, the frames passing through the line 51 and the frames passing through the line 52 do not overlap, and only different frames are exchanged. That is, the 2+0 mode is the mode that realizes distribution of the line load, i.e., the load balance. The line 51 and the line 52 are subjected to the link aggregation (i.e., treated as one virtual line).

Figure 4:
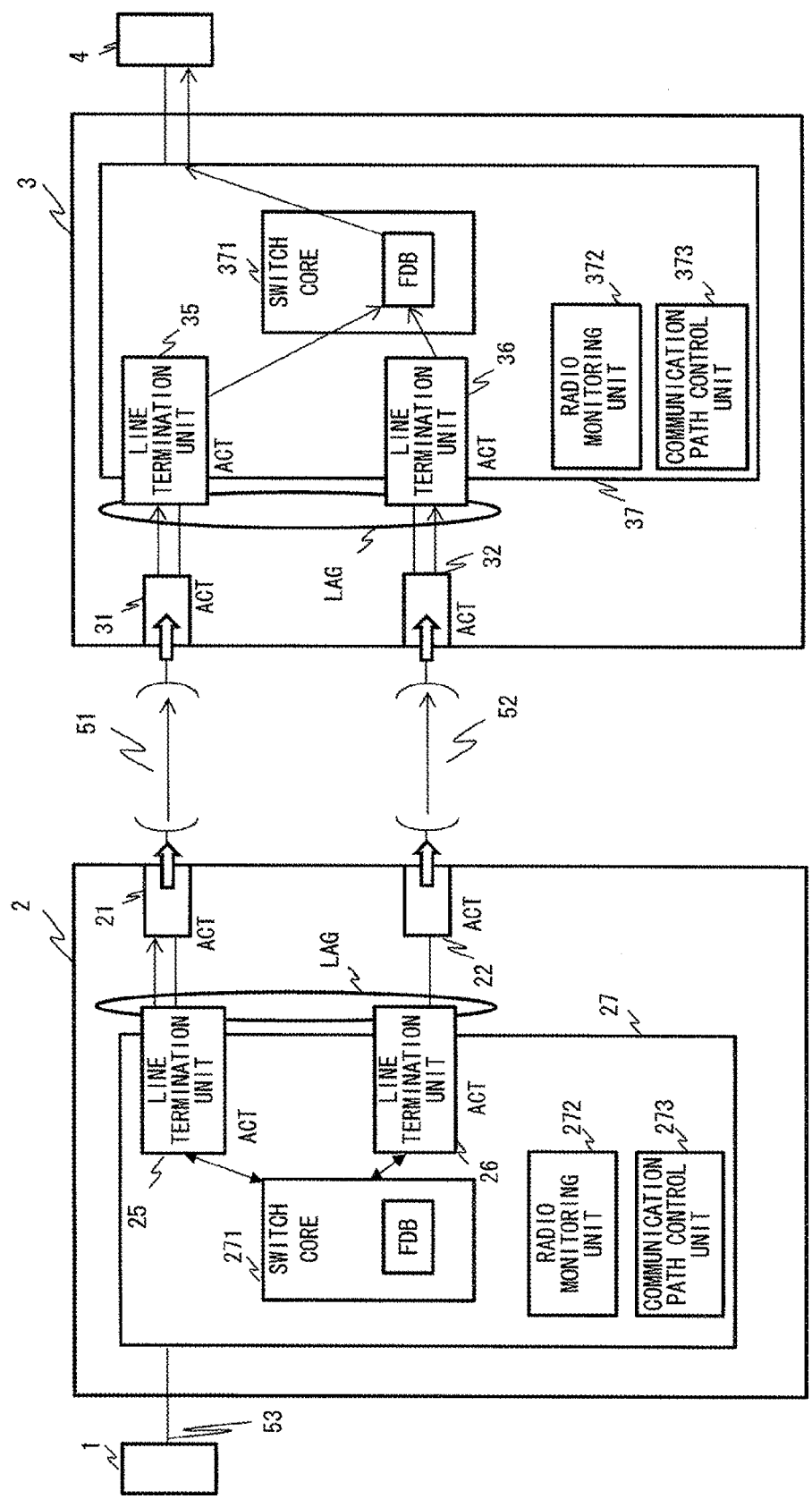
FIG. 4 shows the operations of the system according to the first embodiment (when a 2+0 mode is set)

FIG. 4 shows the operation of the system in the 2+0 mode (in which the line 51 and the line 52 are the main lines).

When it is determined to operate in the 2+0 mode (when the mode is set), the line termination units and the wireless line termination units start performing operations corresponding to the 2+0 mode. The radio monitoring unit 272 detects that the wireless lines are made redundant, and that the redundancy is made in the 2+0 mode. Then, the radio monitoring unit 272 notifies the detection result to the communication path control unit 273.

The radio monitoring unit 272 calculates the wireless section band, and notifies the calculation result to the communication path control unit 273. The communication path control unit 273 sets the LAG (link aggregation) to the line termination units 25 and 26 in response to setting of redundancy in the 2+0 mode. Specifically, the communication path control unit 273 sets the line termination unit 25 and the line termination unit 26 to each be the active system (ACT). By providing the line termination units being two active systems, frames are transmitted and received as being distributed between the line 51 and the line 52.

Note that the operation described above is performed also as to the layer 2 switch 3.

Next, a description will be given of the operations when frames are transmitted from the device 1 to the device 4. Note that, in the following description, it is understood that an appropriate value is previously set in the FDB in the switch core 271.

The switch core 271 receives frames transmitted from the device 1. Since the destination of the received frames is the device 4, the switch core 271 transmits the frames to one of the line termination unit 25 and the line termination unit 26, such that the frames are transmitted to the layer 2 switch 3. Here, since the line load is distributed, the switch core 271 allocates the frames to the line termination unit 25 and the line termination unit 26 substantially evenly. The line termination unit 25 transmits the frames to the wireless line termination unit 21. Similarly, the line termination unit 26 transmits the frames to the wireless line termination unit 22. The wireless line termination unit 21 transmits the received frames to the wireless line termination unit 31. The wireless line termination unit 22 transmits the received frames to the wireless line termination unit 32.

The wireless line termination unit 31 and the wireless line termination unit 32 respectively receive the frames. The wireless line termination unit 31 transmits the received frames to the line termination unit 35. Similarly, the wireless line termination unit 32 transmits the received frames to the line termination unit 36. The line termination unit 35 and the line termination unit 36 transmit the received frames to the switch core 371.

Since the line termination unit 35 and the line termination unit 36 have been subjected to the link aggregation, the switch core 371 treats the frames as being supplied from one line. The switch core 371 transmits the frames being input from the line termination unit 35 and the line termination unit 36 to the device 4.

Note that, though the description above has been given of the case where the device 1 transmits frames to the device 4, substantially identical operations are performed also in the case where the device 4 transmits frames to the device 1.

Figure 5:
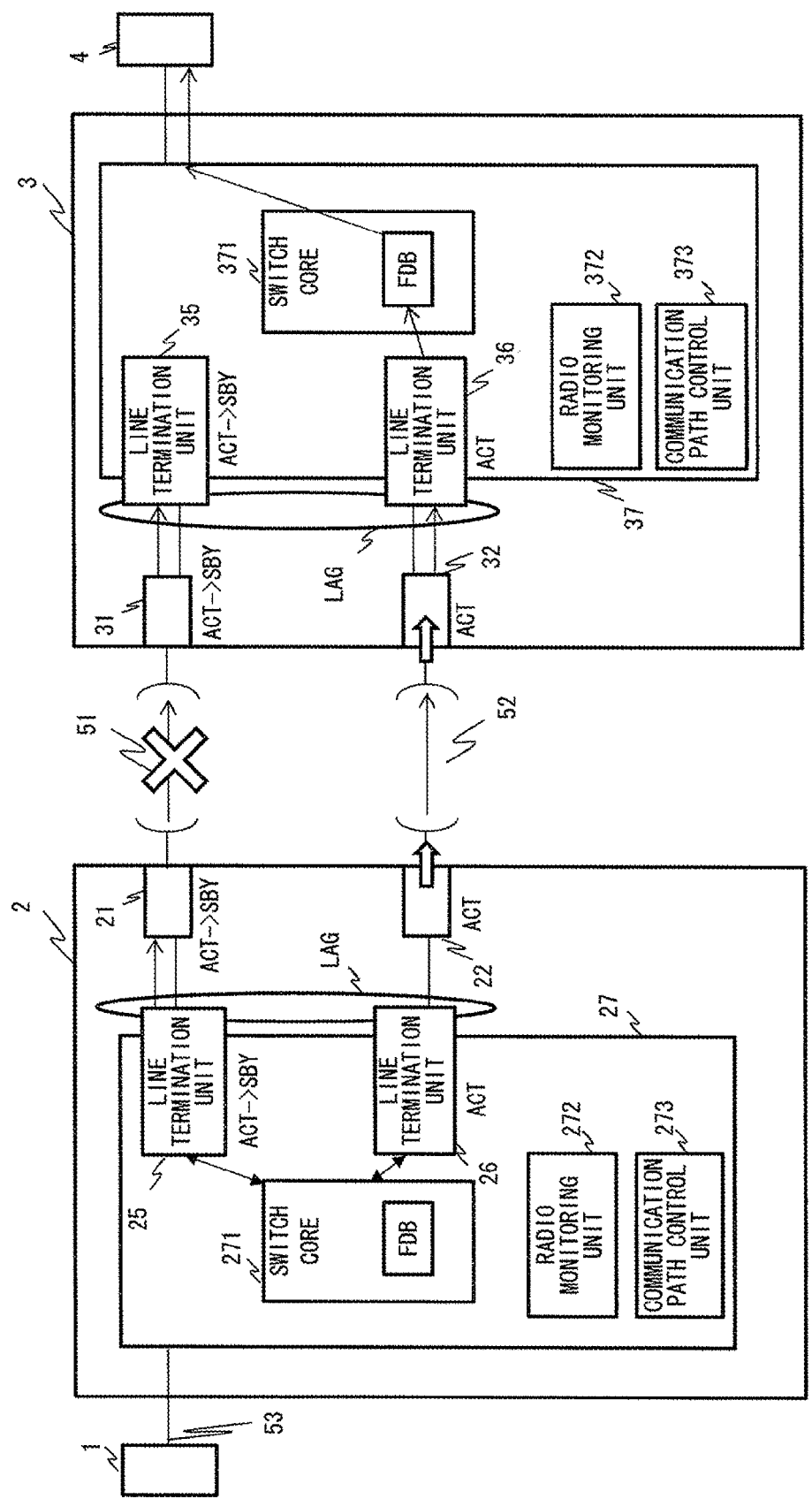
FIG. 5 shows the operations of the system according to the first embodiment (when the 2+0 mode is set)

Next, with reference to FIG. 5, a description will be given of the operations of the system in the case where the line 51 encounters any defective conditions in the configuration shown in FIG. 4 (the 2 (N)+0 mode). As described above, the radio monitoring unit 272 monitors the status of the line 51 and the line 52. The radio monitoring unit 272 notifies the communication path control unit 273 about an occurrence of an abnormality in the line 51. Since the system is operating in the 2+0 mode and an abnormality is occurring in the line 51, the communication path control unit 273 changes the line termination unit 25 to be the standby system (SBY). Here, the line 51 and the line 52 are treated as one virtual line (i.e., subjected to the link aggregation). Therefore, it is treated as no abnormality occurring as the entire line, and hence no FDB flush occurs.

Subsequently, a description will be given of frame transmission from the device 1 to the device 4 when an abnormality is occurring in the line 51. As described above, under the control of the communication path control unit 273, the line termination unit 25 serves as the standby system (SBY). Accordingly, the switch core 271 transmits frames to the line termination unit 26 operating as the active system (ACT). The line termination unit 26 successively transmits the frames to the line termination unit 36. Here, since the line 51 and the line 52 are treated as one virtual line by the link aggregation, it is not treated as an abnormality occurring in this line. Accordingly, in the switch core 271, no FDB flush occurs.

Next, a description will be given of the operation of the layer 2 switch 3 on the reception side. The wireless line termination unit 32 receives frames via the line 52. Note that, similarly to the layer 2 switch 2, the line termination unit 35 is changed to be the standby system (SBY) addressing the abnormality in the line 51. The wireless line termination unit 32 transmits the received frames to the line termination unit 36. The line termination unit 36 supplies the received frames to the switch core 371. The switch core 371 transmits the supplied frames to the device 4. At this time, since the line 51 and the line 52 are treated as one virtual line by the link aggregation, it is not treated as an abnormality occurring in this line. Accordingly, no FDB flush occurs in the switch core 371 also.

Note that, though the description above has been given of the case where the device 1 transmits frames to the device 4, substantially identical operations are performed also in the case where the device 4 transmits frames to the device 1.

Note that, the line termination unit and the wireless line termination unit that each serve as the standby system (SBY) upon the occurrence of an abnormality in the 2+0 mode are set to the transmission-disabled/reception-enabled (standby-admit) state. Thus, even in the case where an abnormality is highly possibly occurring in a line, the frames normally received via that line can be provided to the destination device as they are, and hence losses of frames are reduced.

Figure 6:
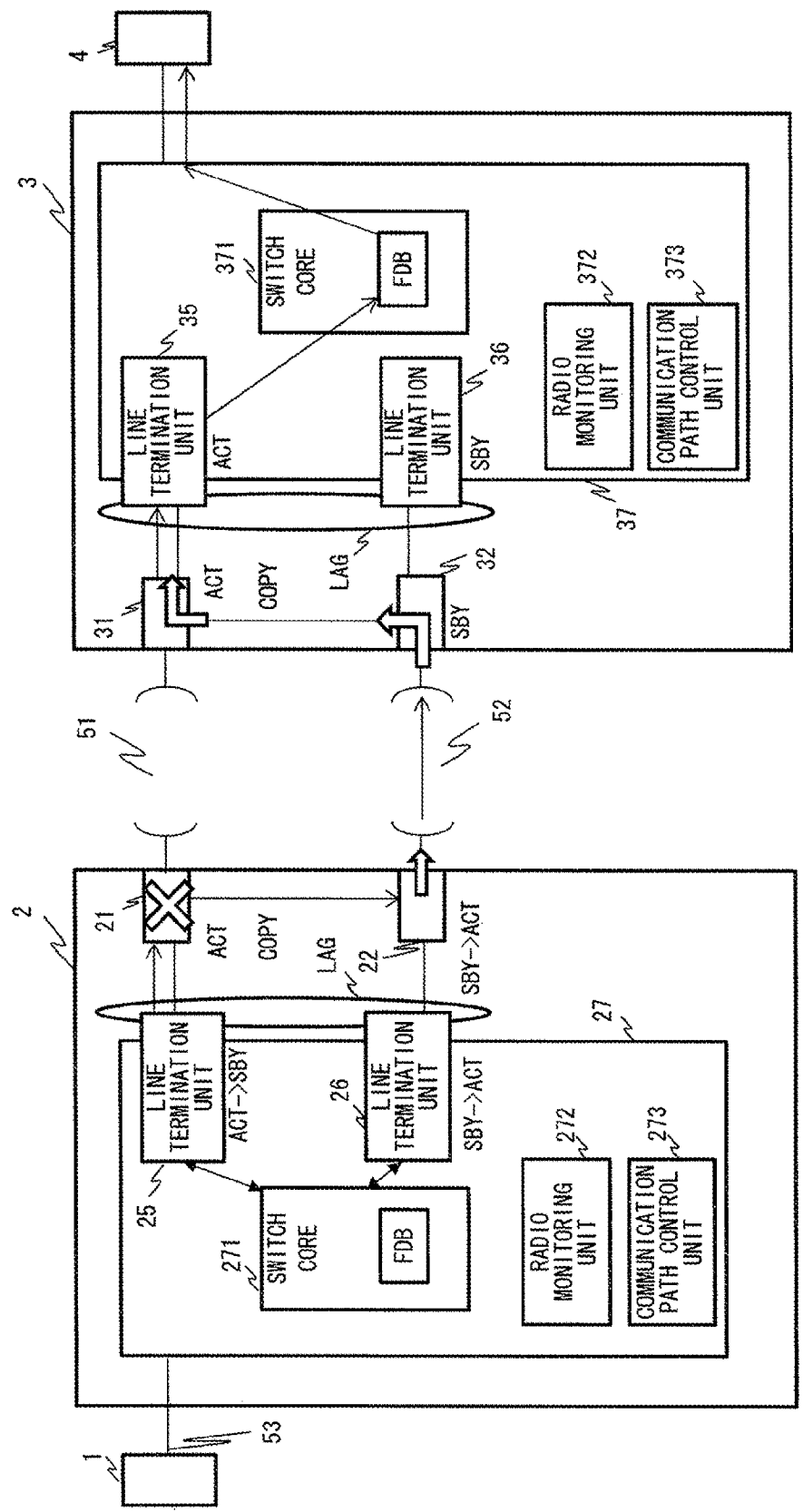
FIG. 6 shows the operations of the system according to the first embodiment (when a wireless line termination unit is replaced)

Subsequently, with reference to FIG. 6, a description will be given of the operation of the system when the wireless line termination unit is replaced. FIG. 6 shows the operation of the system when the work of replacing the wireless line termination unit 21 is performed in the 1+1 mode redundancy configuration. In the initial state, the wireless line termination unit 21 and the line termination unit 25 each operate as the active system (ACT), and the wireless line termination unit 22 and the line termination unit 26 each operate as the standby system (SBY).

As described above, the wireless line termination unit 21 is a card-shaped device in general. When the wireless line termination unit 21 is removed from the layer 2 switch 2, the radio monitoring unit 272 detects the removal of the wireless line termination unit 21, i.e., the abnormal state. When the radio monitoring unit 272 detects the removal, the radio monitoring unit 272 instructs the wireless line termination unit 22 operating as the standby system (SBY) to operate as the active system (ACT). Further, the radio monitoring unit 272 notifies the communication path control unit 273 about the abnormal state of the wireless line termination unit 21 (i.e., the card removal).

The communication path control unit 273 having received the notification changes the operations of the line termination unit 25 and the line termination unit 26. Specifically, the communication path control unit 273 changes the setting of the line termination unit 25 from the active system (ACT) to the standby system (SBY), and changes the setting of the line termination unit 26 from the standby system (SBY) to the active system (ACT).

Here, since the line 51 and the line 52 are subjected to the link aggregation and the line 52 is usable, it is treated as no abnormality occurring as the entire virtual line. Accordingly, the FDB flush in the switch core 271 is not performed. Note that, in the opposite layer 2 switch 3, the abnormality in the line 51 is detected by the radio monitoring unit 372. The operation in this case is similar to that having been described with reference to FIG. 3.

Subsequently, a description will be given of frame transmission from the device 1 to the device 4 when a replacing work of the wireless line termination unit 21 takes place. The switch core 271 receives frames whose destination is the device 4 from the device 1. The switch core 271 transmits the received frames to the line termination unit 26 set to be the active system (ACT). The line termination unit 26 transmits the frames to the layer 2 switch 3 via the wireless line termination unit 22 via the line 52. The operation of the layer 2 switch 3 becomes similar to that having been described with reference to FIG. 3.

Subsequently, a description will be given of frame transmission from the device 4 to the device 1 when a replacing work of the wireless line termination unit 21 takes place. The switch core 371 receives frames whose destination is the device 1 from the device 4. The switch core 371 transmits the received frames to the line termination unit 35 set to be the active system (ACT). The line termination unit 35 transmits the received frames to the wireless line termination unit 31. The wireless line termination unit 31 transmits frames being the copy of the received frames to the wireless line termination unit 32. The wireless line termination unit 32 transmits the copy frames to the wireless line termination unit 32. The wireless line termination unit 22 passes the received frames to the switch core 271 via the line termination unit 26. The switch core 271 transmits the frames to its destination, i.e., the device 1.

Since the line 51 and the line 52 are subjected to the link aggregation and the line 52 is usable, it is treated as no abnormality occurring as the entire virtual line. Accordingly, the FDB flush in the switch core 271 and the switch core 371 is not performed.

As has been described above, no FDB flush is performed upon a failure in any wireless line section and upon replacement of any wireless line termination unit when the wireless line is made redundant (1 (N)+1 mode, 2 (N)+0 mode). By the FDB flush not being performed, frame flooding is not invited. That is, it becomes possible to suppress an increase in the traffic.

Figure 7:
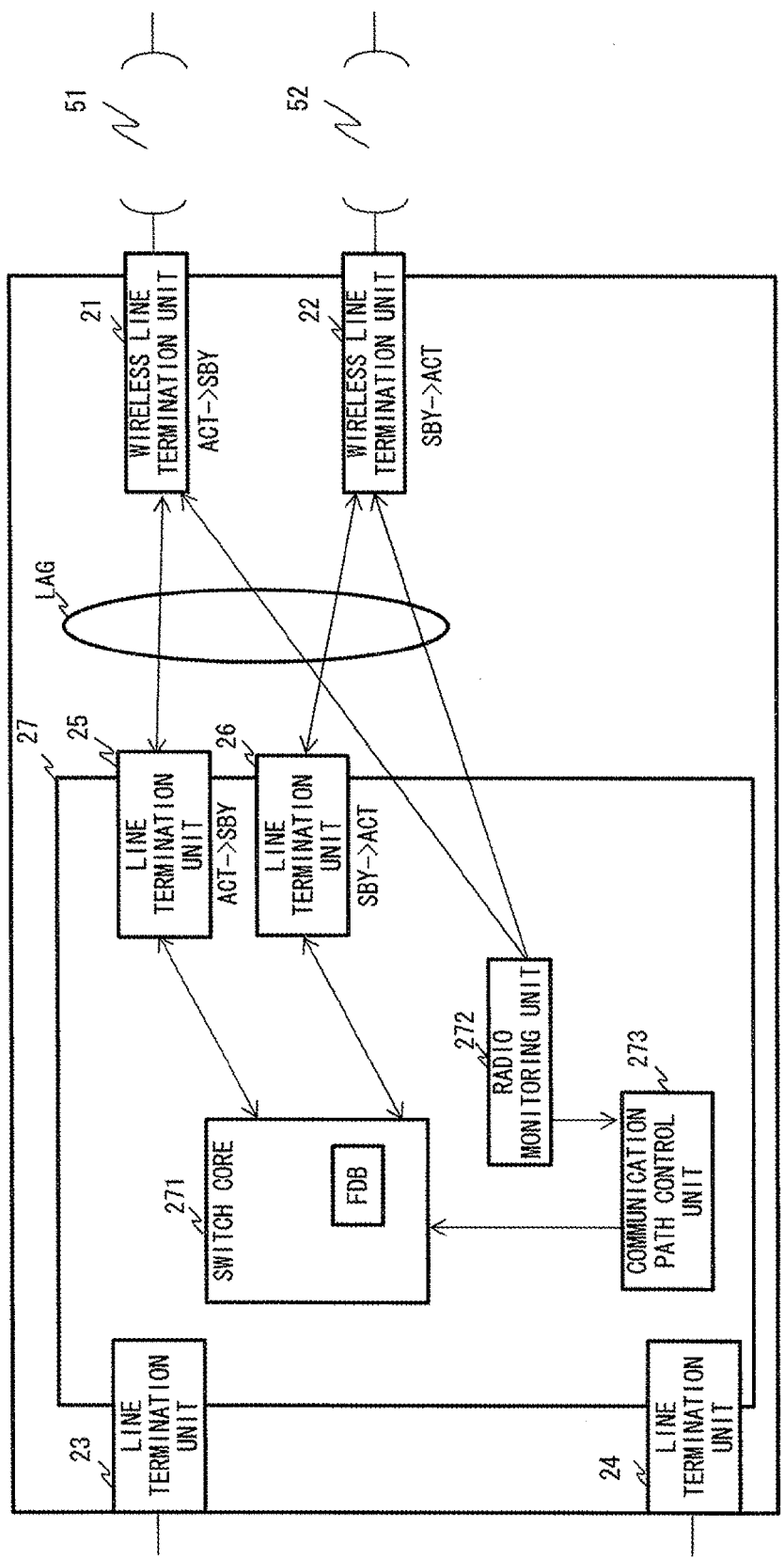
FIG. 7 shows the operations of the system according to the first embodiment (when the band of the wireless line changes)

Next, with reference to FIGS. 7 to 10, a description will be given of the operations of the system when the radio band has changed. FIG. 7 is a block diagram showing the operations of the layer 2 switch 2 when the radio band has changed while the wireless line section is made redundant in the 1+1 mode.

Figure 8:
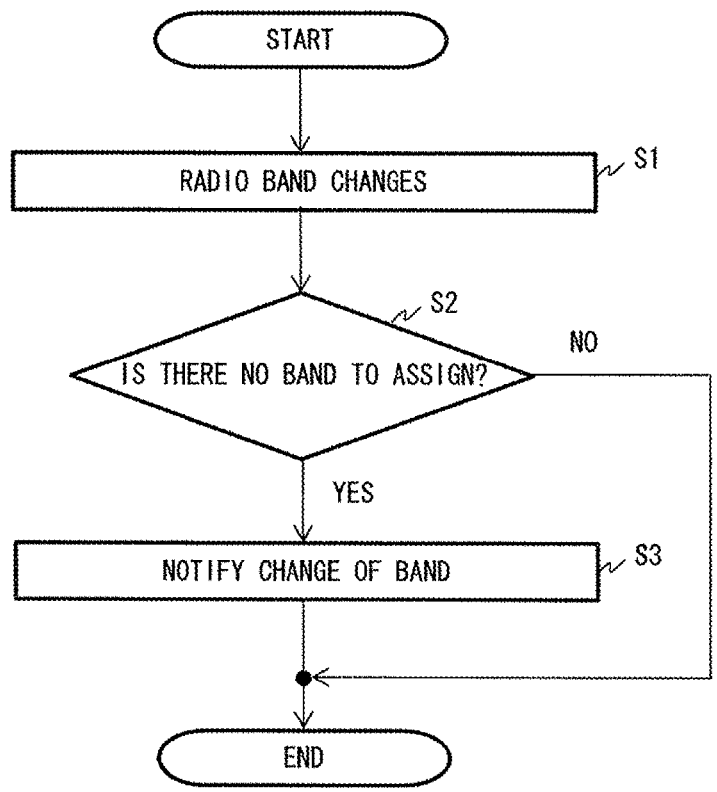
FIG. 8 is a flowchart showing the operations of the radio monitoring unit according to the first embodiment.

Firstly, with reference to FIGS. 7 and 8, a description will be given of the operations of the radio monitoring unit 272. FIG. 8 is a flowchart showing the operations of the radio monitoring unit 272 when the radio band has changed. Firstly, the radio monitoring unit 272 detects a change in the band of wireless lines in use (S1). When a change in the band of a certain wireless line is detected (S1), the radio monitoring unit 272 calculates the band that can be used by the line, and examines whether or not there is no band that can be assigned (S2). When there is no band that can be assigned, that is, when the band of a certain wireless line is 0 (S2: Yes), the radio monitoring unit 272 notifies the communication path control unit 273 about the same (S3).

Figure 9:
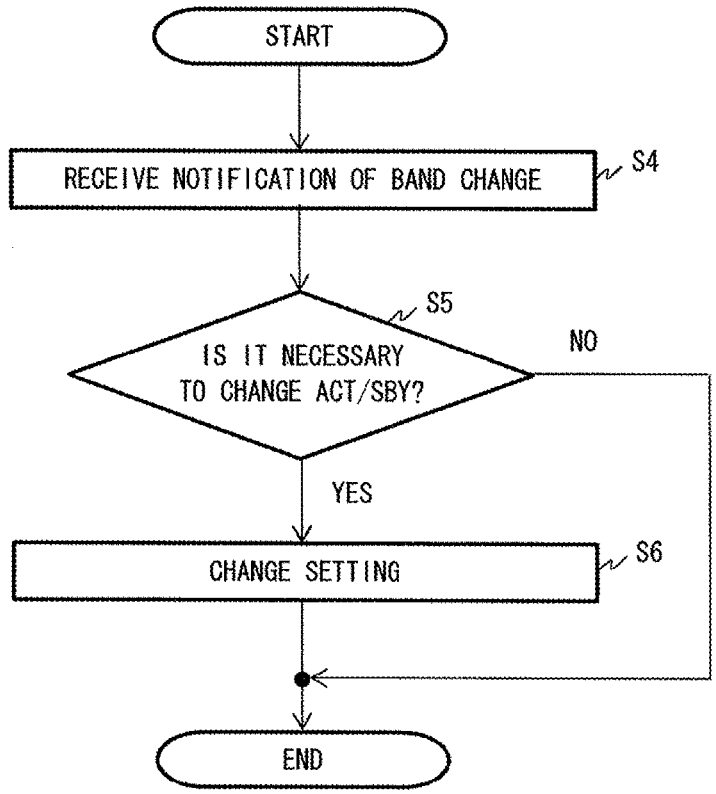
FIG. 9 is a flowchart showing the operations of a communication path control unit according to the first embodiment.

Next, with reference to FIGS. 7 and 9, a description will be given of the operations of the communication path control unit 273 notified that the band is 0 by the radio monitoring unit 272. FIG. 9 is a flowchart showing the operations of the communication path control unit 273 notified that the band is 0 by the radio monitoring unit 272.

The communication path control unit 273 checks whether or not the band of the notified wireless line is 0 (S4). The communication path control unit 273 determines whether or not the switchover of active system (ACT)/standby system (SBY) is required, based on the state of the band and the usage state of the current active system (ACT)/standby system (SBY) (S5). For example, when the band becoming 0 has been used as the active system (ACT), the communication path control unit 273 determines that a switchover of the active system (ACT)/standby system (SBY) is required (S5: Yes).

When the switchover of the active system (ACT)/standby system (SBY) is required (S5: Yes), the communication path control unit 273 changes the setting (S6). For example, when the wireless line termination unit 21 and the line termination unit 25 are each used as the active system (ACT), the communication path control unit 273 changes the setting such that the wireless line termination unit 21 and the line termination unit 25 each become the standby system (SBY), and that the wireless line termination unit 22 and the line termination unit 26 each become the active system (ACT).

Figure 10:
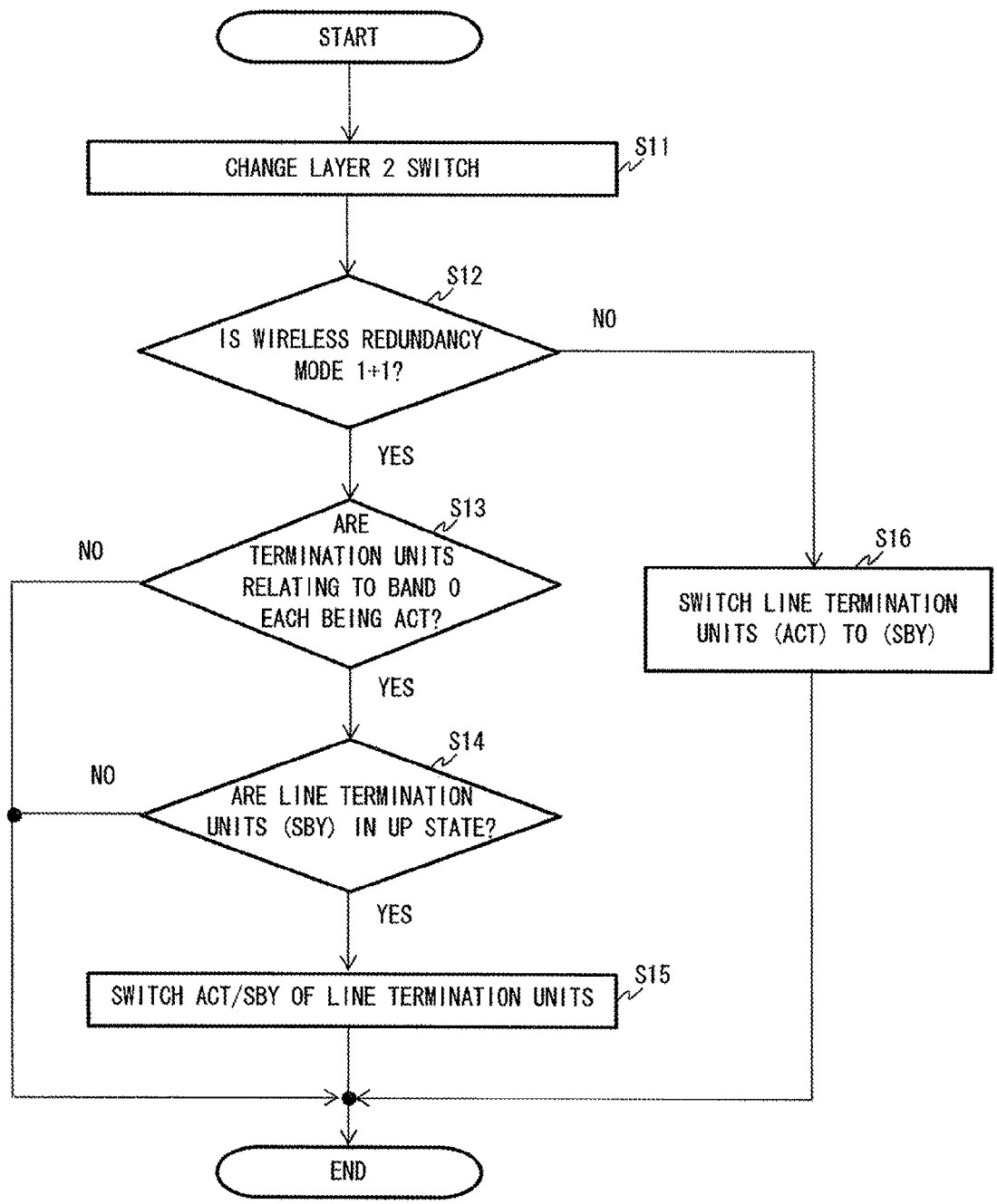
FIG. 10 is a flowchart showing the operations of the communication path control unit according to the first embodiment.

Next, with reference to FIG. 10, a description will be given of the detailed operations of the communication path control unit 273 (i.e., the detail of the aforementioned S4 to S6). FIG.

10 is a flowchart showing the detail of the operations of the communication path control unit 273 when the band has changed.

The communication path control unit 273 receives a notification as to the radio band from the radio monitoring unit 272 (S11). The communication path control unit 273 checks whether or not the wireless redundancy mode is 1 (N)+1 (S12).

When the wireless redundancy mode is 1+1 (S12: Yes), the communication path control unit 273 determines whether or not the wireless line termination unit and the line termination unit are each operating as the active system (ACT) connected to the line whose band has become 0 (S13).

When the wireless line termination unit and the line termination unit connected to the line whose band has become 0 are each operating as the active system (ACT) (S13: Yes), and the wireless line termination unit and the line termination unit each being the standby system (SBY) are capable of normally operating (S14: Yes), the communication path control unit 273 changes the setting (S15). Specifically, the communication path control unit 273 sets the wireless line termination unit and the line termination unit each having been operating as the active system (ACT) to each be the standby system (SBY), and sets the wireless line termination unit and the line termination unit each having been operating as the standby system (SBY) to each be the active system (ACT).

When the wireless redundancy mode is 2+0 (S12: No), the communication path control unit 273 sets the wireless line termination unit and the line termination unit connected to the line whose band has become 0 to each be the standby system (SBY) (S16).

As has been described with reference to FIGS. 7 to 10, even when the band state in the wireless lines has changed, the change can be detected to quickly change the setting. Thus, the frame losses can be minimized.

Figure 11:
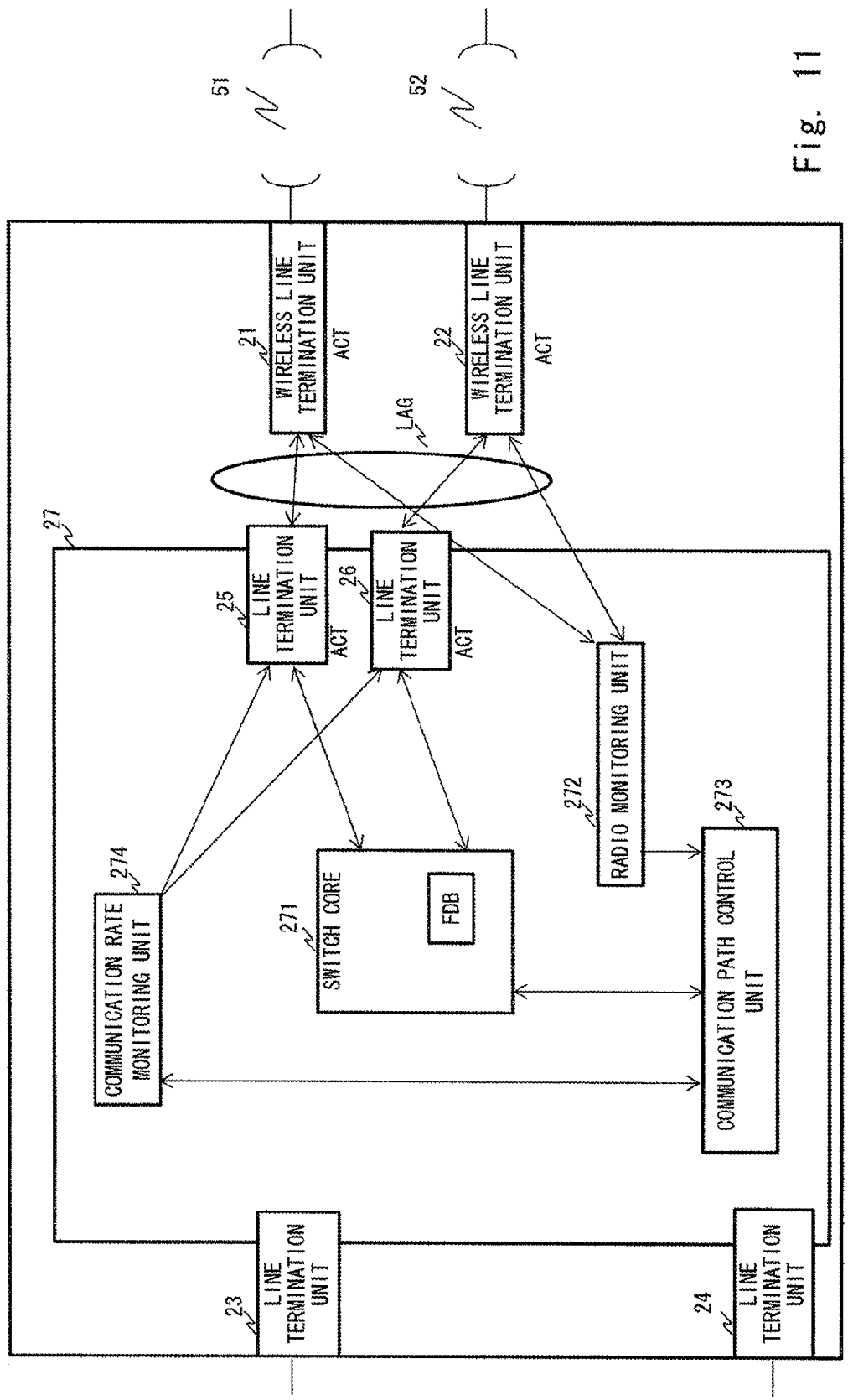
FIG. 11 shows the operations of the system according to the first embodiment (when the band is optimized in the 2+0 configuration)
Figure 12:
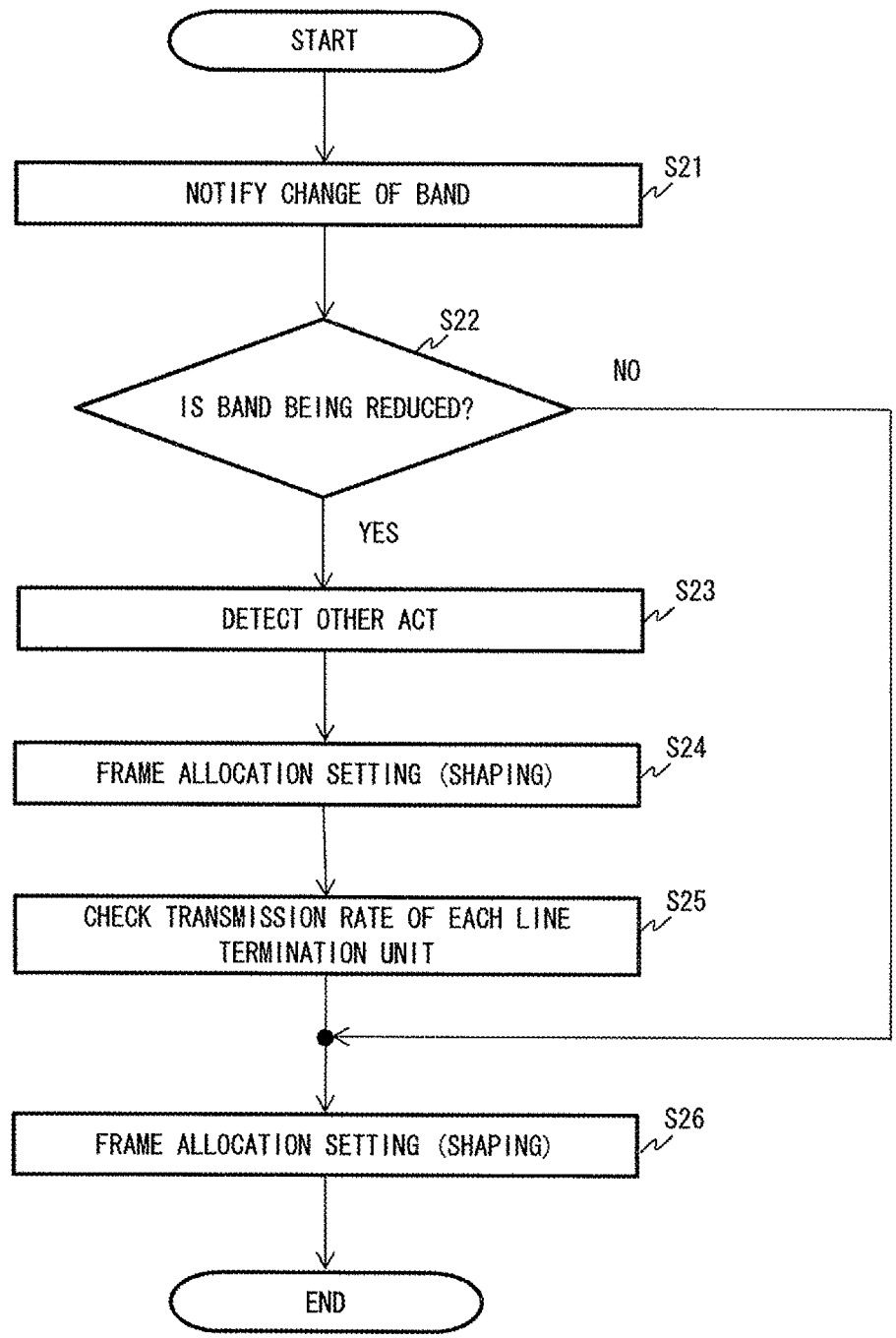
FIG. 12 is a flowchart showing the operations of a layer 2 switch according to the first embodiment.

Subsequently, a description will be given of resetting of the line termination units and the wireless line termination units when the N+0 redundancy mode is set. FIG. 11 is a block diagram showing the resetting. FIG. 12 is a flowchart showing the operation of the resetting of the layer 2 switch 2.

The layer 2 switch 2 newly includes a communication rate monitoring unit 274 in the switch unit 27. The communication rate monitoring unit 274 is a processing unit detecting the transmission rate of each of the line termination units in the wireless section. The communication rate monitoring unit 274 notifies the detected transmission rate of each of the line termination units to the communication path control unit 274.

Subsequently, a description will be given of the operation with reference to FIG. 12. Firstly, the radio monitoring unit 272 monitors a change in the band of each line in the wireless section. Then, at a prescribed timing (e.g., when the AMR (Adaptive Modulation Radio) is set), the radio monitoring unit 272 notifies a change in the state of the band of a certain line to the communication path control unit 273 (S21).

When the band of the line being notified to the communication path control unit 273 has been reduced from the previous band (S22: Yes), the communication path control unit 273 recognizes other lines in operation (S23), and performs the shaping setting (S24), i.e., changes the band setting such that the frame allocation becomes optimum.

Next, the communication rate monitoring unit 274 acquires the transmission rate of the line termination units (25 and 26), and checks whether or not the setting value of the band changed in S24 is exceeded (S25). Thereafter, the communication path control unit 273 again sets the band such that allocation of frames is optimized (S26).

On the other hand, when the band of the line being notified to the communication path control unit 273 has not been reduced from the previous band (S22: No), the communication path control unit 273 waits to be notified about any change in the band of other line, and thereafter performs the shaping setting (S26), i.e., changes the setting of the band of each line such that the frame allocation is optimized.

Subsequently, a description will be given of the effect of the present invention. As has been described above, since no FDB flush occurs with the layer 2 switch (switching device) according to the present embodiment upon any failure of any wireless line or in replacing any wireless line termination unit, the frame flooding will not occur. That is, it becomes possible to prevent unnecessary transmission of frames.

Further, as has been described with reference to FIGS. 7 to 10, even when the state of the band of any wireless line has changed, the layer 2 switch (switching device) according to the present embodiment can detect the change and can quickly change the setting. Thus, losses of frames can be minimized.

Still further, as has been described with reference to FIGS. 11 and 12, the layer 2 switch (switching device) according to the present embodiment can effectively use the radio band when the N+0 redundancy mode is set.

Note that the present invention is not limited to the embodiment described above, and can be modified as appropriate within a range not departing from the gist of the present invention. While the foregoing description has been given of the layer 2 switch, the present invention is not necessarily limited thereto. The frame transmission-reception scheme is applicable to a bridge device, a layer 3 switch, a router device, a gateway device, an optical relay device and the like.

This application is based upon and claims the benefit of priority from Japanese patent application No. 2011-129789, filed on Jun. 10, 2011, the disclosure of which is incorporated herein in its entirety by reference.

INDUSTRIAL APPLICABILITY

The present invention is applicable to a layer 2 switch, a bridge device, a layer 3 switch, a router device, a gateway device, an optical relay device and the like, each of which performs transmission and reception of frames.

REFERENCE SIGNS LIST

1 device
2 layer 2 switch
21, 22 wireless line termination unit
23 to 26 line termination unit
27 switch unit
271 switch core
272 radio monitoring unit
273 communication path control unit
274 communication rate monitoring unit
3 layer 2 switch
31, 32 wireless line termination unit
33 to 36 line termination unit
37 switch unit
371 switch core
372 radio monitoring unit
373 communication path control unit
4 device

The invention claimed is:
1. A method for controlling frame transmission and reception, wherein a switching device includes first wireless line terminating means for transmitting and receiving frames via a first wireless line, second wireless line terminating means for transmitting and receiving frames via a second wireless line, first line terminating means for exchanging frames with the first wireless line terminating means, and second line terminating means for exchanging frames with the second wireless line terminating means, the switching device performs a link aggregation with which the first and second wireless lines are treated as one virtual line, the switching device monitoring a state of the first and second wireless lines and instructing one of the first and second wireless line terminating means, in accordance with a redundancy mode of the first and second wireless lines, to exchange copy frames with the other wireless line terminating means and to abandon received frames, the switching device sets, in accordance with a monitoring result of the wireless lines, the first and second line terminating means to each be an active system or a standby system, and the switching device passes frames to be transmitted to the line terminating means operating as the active system.

2. A switching device comprising:

first wireless line terminating unit that transmits and receives frames via a first wireless line;

second wireless line terminating unit that transmits and receives frames via a second wireless line;

first line terminating unit that exchanges frames with the first wireless line terminating unit;

second line terminating unit that exchanges frames with the second wireless line terminating unit;

radio monitoring unit that monitors a state of the first and second wireless lines, the radio monitoring unit instructing one of the first and second wireless line terminating unit to exchange copy frames with the other wireless line terminating unit and to abandon the received frames, in accordance with a redundancy mode of the first and second wireless lines;

communication path control unit that sets the first and second line terminating unit to each be an active system or a standby system in accordance with a monitoring result obtained by the radio monitoring unit as to the state of the wireless lines; and a switch core that passes frames to be transmitted to the line terminating unit operating as the active system, wherein the first and second wireless lines are subjected to a link aggregation so as to be treated as one virtual line.

3. The switching device according to claim 2, wherein in setting a first redundancy mode in which the first line terminating unit operates as the active system and the second line terminating unit operates as the standby system, the switch core passes transmission frames to the first line terminating unit, the radio monitoring unit instructs the first wireless line terminating unit to pass copy frames of the transmission frames received from the first line terminating unit to the second wireless line terminating unit, the radio monitoring unit instructing the second wireless line terminating unit to abandon the received frames, and the second wireless line terminating unit transmits the copy frames and abandons the received frame.

4. The switching device according to claim 3, wherein when the radio monitoring unit senses an abnormality in the first wireless line while operating in the first redundancy mode, the radio monitoring unit instructs the second wireless line terminating unit to stop abandoning the received frames and to pass copy frames of the received frames to the first wireless line terminating unit.

5. The switching device according to claim 2, wherein in setting a second redundancy mode in which the first and second line terminating unit each operate as the active system, the switch core passes transmission frames substantially equally to the first line terminating unit and the second wireless line terminating unit.

6. The switching device according to claim 5, wherein when the wireless line terminating unit senses an abnormality in the first or second wireless line while operating in the second redundancy mode, the wireless line terminating unit notifies the communication path control unit about the line with the abnormality, and the communication path control unit sets the wireless line terminating unit connected to the line with the abnormality and the line terminating unit exchanging frames with such wireless line terminating unit to each be the standby system, wherein the line terminating unit and the wireless line terminating unit each changed to be the standby system by the communication path control unit are set to the transmission-disabled/reception-enabled state, as an operation of the standby system.

7. The switching device according to claim 2, wherein in stopping a function of the first wireless line terminating unit while operating in a first redundancy mode in which the first line terminating unit operates as the active system and the second line terminating unit operates as the standby system, the radio monitoring unit notifies the communication path control unit about an abnormality in the first wireless line attributed to the first wireless line terminating unit being stopped, the radio monitoring unit instructing the second wireless line terminating unit to transmit frames passed from the second line terminating unit, and in accordance with the notification, the communication path control unit sets the first line terminating unit to be the standby system and sets the second line terminating unit to be the active system.

8. The switching device according to claim 2, wherein the wireless line terminating unit is structured by a card-shaped removable device.

9. The switching device according to claim 2, wherein the switching device is a layer 2 switch.

10. A switching device comprising:

a first wireless transceiver that transmits and receives frames via a first wireless line;

a second wireless transceiver that transmits and receives frames via a second wireless line;

a first wireline transceiver that exchanges frames with the first wireless line terminating unit;

a second wireline transceiver that exchanges frames with the second wireless line terminating unit;

a radio controller that monitors a state of the first and second wireless lines, the radio monitoring unit instructing one of the first and second wireless transceivers to exchange copy frames with the other wireless transceiver and to abandon the received frames, in accordance with a redundancy mode of the first and second wireless lines;

a wireline controller that sets the first and second wired transceivers to each be an active system or a standby system in accordance with a monitoring result obtained by the radio monitoring unit as to the state of the wireless lines; and a switch core that passes frames to be transmitted to the wireline transceiver operating as the active system, wherein the first and second wireless lines are subjected to a link aggregation so as to be treated as one virtual line.

* * * * *